United States Patent
Wang et al.

(10) Patent No.: US 9,469,757 B2
(45) Date of Patent: Oct. 18, 2016

(54) LOW DISSIPATION FACTOR RESIN COMPOSITION AND PRODUCT MADE THEREBY

(71) Applicant: Elite Electronic Material (KunShan) Co., Ltd., Kunshan, Jiangsu Province (CN)

(72) Inventors: Rongtao Wang, Kunshan (CN); Chen-Yu Hsieh, Taoyuan (TW); Wenfeng Lv, Kunshan (CN); Wenjun Tian, Kunshan (CN); Yu Gao, Kunshan (CN); Ningning Jia, Kunshan (CN); Ziqian Ma, Kunshan (CN)

(73) Assignee: ELITE ELECTRONIC MATERIAL (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 14/730,956

(22) Filed: Jun. 4, 2015

(65) Prior Publication Data
US 2016/0122521 A1    May 5, 2016

(30) Foreign Application Priority Data
Oct. 30, 2014    (CN) .......................... 2014 1 0606009

(51) Int. Cl.
| | |
|---|---|
| *C08L 25/10* | (2006.01) |
| *C08L 29/10* | (2006.01) |
| *C08K 5/5397* | (2006.01) |
| *C08K 5/14* | (2006.01) |
| *C08J 5/18* | (2006.01) |
| *C08L 25/14* | (2006.01) |
| *C08J 5/24* | (2006.01) |
| *C08F 12/34* | (2006.01) |
| *C08L 25/08* | (2006.01) |

(52) U.S. Cl.
CPC ................ *C08L 25/14* (2013.01); *C08F 12/34* (2013.01); *C08J 5/18* (2013.01); *C08J 5/24* (2013.01); *C08K 5/14* (2013.01); *C08K 5/5397* (2013.01); *C08L 25/08* (2013.01); *C08L 25/10* (2013.01); *C08J 2325/10* (2013.01); *C08J 2325/14* (2013.01); *C08J 2425/10* (2013.01); *C08J 2425/14* (2013.01); *C08L 2201/02* (2013.01); *C08L 2203/16* (2013.01); *C08L 2203/20* (2013.01); *C08L 2205/025* (2013.01)

(58) Field of Classification Search
USPC ........................................................ 524/151
See application file for complete search history.

(56) References Cited

U.S. PATENT DOCUMENTS 3,681,281 A  *  8/1972  Juelke et al. ........ C08K 5/5397
                                                     524/129
7,273,900 B2 *  9/2007  Amou .................... H05K 1/032
                                                     524/125

(Continued)

*Primary Examiner* — Vu A Nguyen
(74) *Attorney, Agent, or Firm* — Muncy, Geissler, Olds & Lowe, P.C.

(57) ABSTRACT

A low dissipation factor resin composition comprises: (A) 100 to 150 parts by weight of a vinyl-containing compound or a polymer thereof; (B) 0 to 75 parts by weight of styrene-butadiene-divinylbenzene terpolymer, styrene-butadiene-maleic anhydride terpolymer, vinyl functional polybutadiene urethane oligomer or a combination thereof; (C) 30 to 150 parts by weight of flame retardant; and (D) 0.1 to 10 parts by weight of peroxide. The resin composition and a product made thereby are applicable to a copper-clad laminate and a printed circuit board, characterized by having low dissipation factor at high frequency and satisfactory thermal resistance and thermal expansion.

6 Claims, 2 Drawing Sheets

(56) References Cited

U.S. PATENT DOCUMENTS

| | | | | |
|---|---|---|---|---|
| 2014/0004324 A1* | 1/2014 | Hsieh | C08L 71/123 | 428/209 |
| 2014/0113118 A1* | 4/2014 | Wang | C08L 71/126 | 428/209 |
| 2014/0349090 A1* | 11/2014 | Hsieh | H05K 1/0353 | 428/209 |

* cited by examiner

LOW DISSIPATION FACTOR RESIN COMPOSITION AND PRODUCT MADE THEREBY

CROSS-REFERENCE TO RELATED APPLICATIONS

This application claims priority to Chinese Patent Application No. 201410606009.7, filed on Oct. 30, 2014, the entirety of which is incorporated by reference herein.

FIELD OF THE INVENTION

This invention relates to a low dissipation factor resin composition and more particularly to a resin composition applicable to a copper-clad laminate and a printed circuit board.

BACKGROUND OF THE INVENTION

With the rapid advancement of electronic technology, information processing in mobile communication, servers, mainframe computers and other electronic products has incessantly directed toward high frequency signal transmission and high speed digitalization, and low dielectric resin material has therefore become the mainstream for the development of laminates for high speed data transmission in order to satisfy the demands of high speed information processing.

Conventional resin compositions for copper-clad laminates generally contain epoxy resin used in conjunction with phenolic compounds, amines or acid anhydride curing agents. However, it is difficult for such resin compositions to achieve low dissipation factor (Df) at 10 GHz and balanced thermal resistance and thermal expansion of laminates.

Therefore, it is desirable for skilled artisans to obtain a resin composition capable of achieving a low dissipation factor (Df) at 10 GHz and other satisfactory properties, particularly thermal resistance and thermal expansion such as Tg, T288 and solder dip resistance.

Accordingly, there is a need to provide a resin composition and its product applicable to copper-clad laminates and printed circuit boards featuring low dissipation factor at high frequency and thermal resistance and thermal expansion meeting the demands.

SUMMARY OF THE INVENTION

The first object of this invention is to provide a resin composition applicable to copper-clad laminates and printed circuit boards featuring low dissipation factor at high frequency and thermal resistance and thermal expansion meeting the demands.

The second object of this invention is to provide a product containing said resin composition.

The primary aspect of this invention is to provide a low dissipation factor resin composition, which comprises:

(A) 100 to 150 parts by weight of a vinyl-containing compound or a polymer thereof;

(B) 0 to 75 parts by weight of styrene-butadiene-divinylbenzene terpolymer, styrene-butadiene-maleic anhydride terpolymer, vinyl functional polybutadiene urethane oligomer or a combination thereof;

(C) 30 to 150 parts by weight of flame retardant; and (D) 0.1 to 10 parts by weight of peroxide.

In one embodiment of the present invention, the resin composition consists of:

(A) 100 to 150 parts by weight of a vinyl-containing compound or a polymer thereof;

(B) 0 to 75 parts by weight of styrene-butadiene-divinylbenzene terpolymer, styrene-butadiene-maleic anhydride terpolymer, vinyl functional polybutadiene urethane oligomer or a combination thereof;

(C) 30 to 150 parts by weight of flame retardant; and (D) 0.1 to 10 parts by weight of peroxide.

In one embodiment of the present invention, the vinyl-containing compound or a polymer thereof (A) is selected from a vinyl-containing polymer with a number average molecular weight (Mn) less than 1000, vinyl-containing polyphenylene oxide, maleimide, divinylbenzene, bis(vinylbenzyl) ether, triallyl isocyanurate, diallyl bisphenol A, maleimide prepolymer or a combination thereof.

In one embodiment of the present invention, the vinyl-containing polymer with a number average molecular weight (Mn) less than 1000 is formed by a monomer selected from divinylbenzene, bis(vinylbenzyl) ether, triallyl isocyanurate (TAIC), diallyl bisphenol A and a combination thereof.

In one embodiment of the present invention, the vinyl-containing polyphenylene oxide is vinyl-benzylated polyphenylene oxide resin, vinyl-benzylated modified bisphenol A polyphenylene oxide resin, methacrylic polyphenylene oxide resin or a combination thereof.

In one embodiment of the present invention, the vinyl-containing compound or a polymer thereof is selected from bis(vinylbenzyl) ether compound or a polymer thereof, which comprises a monomer of formula (I), a prepolymer thereof or a copolymer thereof:

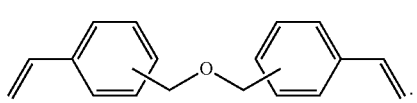

(I)

In one embodiment of the present invention, the bis(vinylbenzyl) ether compound or a polymer thereof is prepared by the following steps:

providing 4-chloro-methyl styrene as starting material;

reacting the 4-chloro-methyl styrene in the presence of a catalytic amount of quaternary ammonium salt as a phase transfer catalyst to obtain a bis(vinylbenzyl) ether compound; and optionally polymerizing the bis(vinylbenzyl) ether compound to obtain a bis(vinylbenzyl) ether polymer;

preferably, the quaternary ammonium salt as a phase transfer catalyst is methyl trioctyl ammonium chloride; and/or preferably, the reaction is carried out in the presence of alkali metal hydroxide so as to obtain the bis(vinylbenzyl) ether compound.

In one embodiment of the present invention, the component (B) is 25 to 75 parts by weight of styrene-butadiene-divinylbenzene terpolymer, styrene-butadiene-maleic anhydride terpolymer, vinyl functional polybutadiene urethane oligomer or a combination thereof.

In one embodiment, the component (B) comprises: 25 to 75 parts by weight of styrene-butadiene-divinylbenzene terpolymer; or 25 to 75 parts by weight of styrene-butadiene-maleic anhydride terpolymer; or 25 to 75 parts by weight of a mixture of styrene-butadiene-divinylbenzene terpolymer and styrene-butadiene-maleic anhydride terpolymer in a ratio of 1:99 to 99:1.

In one embodiment of the present invention, the component (C) has the following structure:

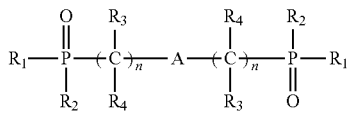
(II)

wherein A is a covalent bond, $C_6$-$C_{12}$ arylene, $C_3$-$C_{12}$ cycloalkylene or $C_6$-$C_{12}$ cycloalkenylene, and wherein the $C_3$-$C_{12}$ cycloalkylene or the $C_6$-$C_{12}$ cycloalkenylene is optionally substituted by $C_1$-$C_{12}$ alkyl;

$R_1$ and $R_2$ are the same or different and individually represent H, alkoxy, aryloxy, alkyl, aryl, or silanyl;

$R_3$ and $R_4$ are the same or different and individually represent H, hydroxyl, or $C_1$-$C_6$ alkyl, or only one of $R_3$ and $R_4$ is present and forms a carbonyl group with the carbon atom; and each n is independently a positive integer of 0 to 6 and n is not 0 when A is $C_6$-$C_{12}$ arylene or a covalent bond.

The flame retardant of this invention preferably has a structure of formula (III) or (IV):

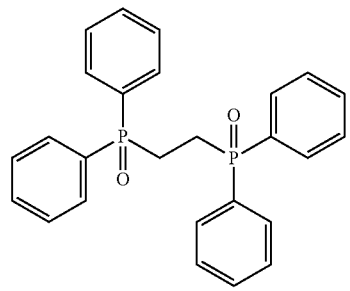
(III)

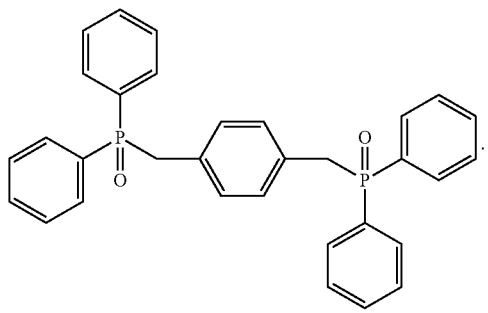
(IV)

The secondary aspect of this invention is to provide a product made by the above-mentioned resin composition, which comprises a resin film, a prepreg, a laminate or a printed circuit board.

BRIEF DESCRIPTION OF THE DRAWINGS

A more complete understanding of the subject matter can be derived by referring to the detailed description and claims when considered in conjunction with the following figures.

DETAILED DESCRIPTION OF THE INVENTION

Figure 1:
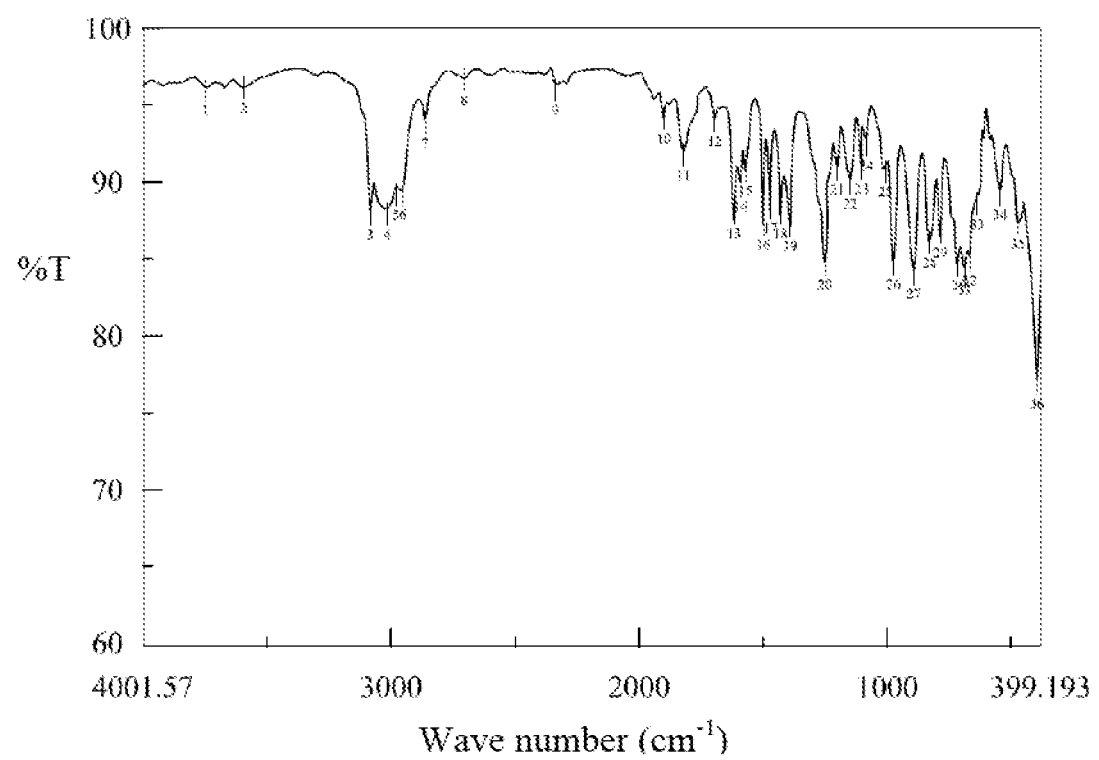
FIG. 1 illustrates the Fourier transform infrared spectroscopy (FTIR) result of 4-chloro-methyl styrene (CMS-P)

As used herein, the terms "comprises," "comprising," "includes," "including," "has," "having" and any other variation thereof indicate that different ingredients or components may be used together in the mixture or composition of this invention. Therefore, the terms "consisting essentially of" and "consisting of" are encompassed by the terms "comprises," "comprising," "includes," "including," "has," "having" and any other variation thereof.

Unless otherwise specified, the term "alkyl" as used herein denotes a linear, branched, or cyclic hydrocarbon group having from 1 to 10 carbon atoms and preferably 2 to 10 carbon atoms. Exemplary alkyl groups include but are not limited to methyl, ethyl, n-propyl, isopropyl, n-butyl, isobutyl, and tert-butyl.

Unless otherwise specified, the term "aryl" as used herein denotes a monocyclic aromatic hydrocarbon group with 6 carbon atoms, a bicyclic aromatic hydrocarbon group with 10 carbon atoms, or a tricyclic aromatic hydrocarbon group with 14 carbon atoms, wherein each ring may contain 1 to 4 substituents. Exemplary aryl groups include but are not limited to phenyl, naphthyl, and anthranyl.

As used herein, "alkoxy" and "aryloxy" respectively refer to "alkyl-O-" and "aryl-O-".

These and other aspects of the present invention are described in detail below.

Low Dissipation Factor Resin Composition

A first aspect of this invention provides a low dissipation factor resin composition, comprising:

(A) 100 to 150 parts by weight of a vinyl-containing compound or a polymer thereof;

(B) 0 to 75 parts by weight of styrene-butadiene-divinylbenzene terpolymer, styrene-butadiene-maleic anhydride terpolymer, vinyl functional polybutadiene urethane oligomer or a combination thereof;

(C) 30 to 150 parts by weight of flame retardant; and (D) 0.1 to 10 parts by weight of peroxide.

In one embodiment of the present invention, the resin composition consists of the following components:

(A) 100 to 150 parts by weight of a vinyl-containing compound or a polymer thereof;

(B) 0 to 75 parts by weight of styrene-butadiene-divinylbenzene terpolymer, styrene-butadiene-maleic anhydride terpolymer, vinyl functional polybutadiene urethane oligomer or a combination thereof;

(C) 30 to 150 parts by weight of flame retardant; and (D) 0.1 to 10 parts by weight of peroxide.

In one preferred embodiment, the composition comprises:

(A) 100 to 150 parts by weight of a vinyl-containing compound or a polymer thereof;

(B) 25 to 75 parts by weight of styrene-butadiene-divinylbenzene terpolymer, styrene-butadiene-maleic anhydride terpolymer, vinyl functional polybutadiene urethane oligomer or a combination thereof;

(C) 30 to 150 parts by weight of flame retardant; and (D) 0.1 to 10 parts by weight of peroxide.

Each component will now be described in detail below.

(A) Vinyl-Containing Compound or Polymer Thereof

In one embodiment, the vinyl-containing compound or a polymer thereof is a vinyl-containing polymer with a number average molecular weight (Mn) less than 1000, vinyl-containing polyphenylene oxide, maleimide, divinylbenzene, bis(vinylbenzyl) ether, triallyl isocyanurate, diallyl bisphenol A, maleimide prepolymer or a combination thereof.

Preferably, the vinyl-containing polymer with a number average molecular weight (Mn) less than 1000 is formed by a monomer selected from divinylbenzene (DVB), bis(vinylbenzyl) ether (BVBE), triallyl isocyanurate (TAIC), diallyl bisphenol A, styrene, brominated styrene, and 2-propenoic acid,1,1'-[(octahydro-4,7-methano-1H-indene-5,6-diyl)bis(methylene)]ester (such as SR833S available from Cray Valley).

More preferably, the vinyl-containing polymer with a number average molecular weight (Mn) less than 1000 contains a monomer selected from divinylbenzene, bis(vinylbenzyl) ether, triallyl isocyanurate, diallyl bisphenol A and a combination thereof.

In one embodiment of the present invention, the vinyl-containing compound or a polymer thereof is selected from bis(vinylbenzyl) ether compound or a polymer thereof, which comprises a monomer of formula (I), a prepolymer thereof or a copolymer thereof:

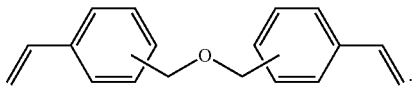

(I)

In one embodiment of the present invention, the bis(vinylbenzyl) ether compound or a polymer thereof is prepared by the following steps:
providing 4-chloro-methyl styrene as starting material; and
reacting the 4-chloro-methyl styrene in the presence of a catalytic amount of quaternary ammonium salt as a phase transfer catalyst to obtain a bis(vinylbenzyl) ether compound.

Optionally, the bis(vinylbenzyl) ether compound may be further polymerized to obtain a bis(vinylbenzyl) ether polymer.

Preferably, the quaternary ammonium salt as a phase transfer catalyst is methyl trioctyl ammonium chloride.

Preferably, the reaction is carried out in the presence of alkali metal hydroxide so as to obtain the bis(vinylbenzyl) ether compound.

The present inventors found that the use of the vinyl-containing polymer with a number average molecular weight (Mn) less than 1000, which is a liquid-state resin, may enhance the compatibility of the resin composition and increase crosslinkability.

The present inventors further found that using bis(vinylbenzyl) ether instead of other vinyl-containing resins in the low dissipation factor resin composition of the present invention may effectively increase crosslinkability, and the increased crosslinking density may promote bonding between the resins and increase Tg, thereby achieving lower (better) dielectric properties.

In one embodiment, the vinyl-containing polyphenylene oxide is vinyl-benzylated polyphenylene oxide resin, vinyl-benzylated modified bisphenol A polyphenylene oxide resin, methacrylic polyphenylene oxide resin or a combination thereof.

The vinyl-containing polyphenylene oxide is a vinyl-terminated polyphenylene oxide resin, such as vinyl-benzylated polyphenylene oxide resin (OPE-2st, available from Mitsubishi Gas Chemical Co., Inc.), vinyl-benzylated modified bisphenol A polyphenylene oxide resin, or methacrylic polyphenylene oxide resin (SA-9000, available from Sabic).

The maleimide may be a monofunctional, bifunctional or multifunctional maleimide. The maleimide is not particularly limited and encompasses all types of maleimides conventionally used in this field.

The maleimide prepolymer is a product of maleimide pre-reacted with a crosslinking agent, which may be a diamine compound (such as diamino diphenyl sulfone, DDS), oxydianiline (ODA), diamino diphenyl methane (DDM), TRIC or DABPA. The pre-reaction may be but not limited to mixing maleimide with DDS at 60° C. for two hours to pre-crosslink them; alternatively, the pre-reaction may also be mixing two different maleimides (BMI-2300 and BMI-5100) with DDS at 60° C. for two hours to pre-crosslink them.

(B) Styrene-Butadiene-Divinylbenzene Terpolymer, Styrene-Butadiene-Maleic Anhydride Terpolymer, Vinyl Functional Polybutadiene Urethane Oligomer or Combination Thereof In one embodiment, the component (B) is 25 to 75 parts by weight of styrene-butadiene-divinylbenzene terpolymer, styrene-butadiene-maleic anhydride terpolymer, vinyl functional polybutadiene urethane oligomer or a combination thereof.

In one embodiment, the component (B) comprises 25 to 75 parts by weight of styrene-butadiene-divinylbenzene terpolymer, or 25 to 75 parts by weight of styrene-butadiene-maleic anhydride terpolymer, or 25 to 75 parts by weight of a mixture of styrene-butadiene-divinylbenzene terpolymer and styrene-butadiene-maleic anhydride terpolymer at a weight ratio from 1:99 to 99:1.

The styrene-butadiene-divinylbenzene terpolymer is not particularly limited, and any common styrene-butadiene-divinylbenzene terpolymer is useful (such as Ricon 250 or Ricon 257 available from Cray Valley).

The styrene-butadiene-maleic anhydride terpolymer is not particularly limited, and any common styrene-butadiene-maleic anhydride terpolymer is useful (such as Ricon 184 or Ricon 184MA available from Cray Valley).

The vinyl functional polybutadiene urethane oligomer is not particularly limited, and any common vinyl functional polybutadiene urethane oligomer is useful (such as R45VT available from Cray Valley).

(C) Flame Retardant

The flame retardant according to the present invention may be phosphorous-containing flame retardant or brominated flame retardant, wherein the brominated flame retardant is not particularly limited and preferably selected from the group consisting of ethylene-bis(tetrabromophthalimide) (e.g. SAYTEX BT-93 commercially available from Albemarle), 1,2-bis(pentabromophenyl) ethane (e.g. SAYTEX 8010 commercially available from Albemarle), and 2,4,6-tris(2,4,6-tribromophenoxy)-1,3,5-triazine (e.g. FR-245 commercially available from ICL Industrial Products). The phosphorous-containing flame retardant may be at least one of the following group, but not limited thereto: bisphenol diphenyl phosphate, ammonium polyphosphate, hydroquinone bis-(diphenyl phosphate), bisphenol A bis-(diphenyl-phosphate), tri(2-carboxyethyl)phosphine (TCEP), tri(chloroisopropyl) phosphate, trimethyl phosphate (TMP), dimethyl methyl phosphonate (DMMP), resorcinol bis(dixylenyl phosphate) (RDXP, such as PX-200), phosphazene (such as SPB-100), melamine polyphosphate, 9,10-dihydro-9-oxa-10-phosphaphenanthrene-10-oxide (DOPO) and its derivative or resin, melamine cyanurate and tri-hydroxy ethyl isocyanurate. For example, the flame retardant compound may be a DOPO compound, DOPO resin (e.g. DOPO-HQ, DOPO-NQ, DOPO-PN, and DOPO-BPN), and DOPO-containing epoxy resin, wherein DOPO-BPN may be bisphenol novolac compounds such as DOPO-BPAN, DOPO-BPFN, and DOPO-BPSN. The flame retardant according to the present invention is preferably a non-reactive flame retardant, which means the flame retardant does not contain a reactive functional group in its chemical structure.

Preferably, the flame retardant according to the present invention has the structure represented by formula (II):

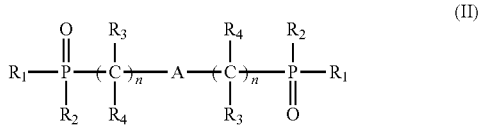

wherein A is a covalent bond, $C_6$-$C_{12}$ arylene, $C_3$-$C_{12}$ cycloalkylene or $C_6$-$C_{12}$ cycloalkenylene, and wherein the $C_3$-$C_{12}$ cycloalkylene or $C_6$-$C_{12}$ cycloalkenylene is optionally substituted by $C_1$-$C_{12}$ alkyl;

$R_1$ and $R_2$ are the same or different and individually represent H, alkoxy, aryloxy, alkyl, aryl, or silanyl;

$R_3$ and $R_4$ are the same or different and individually represent H, hydroxyl, or $C_1$-$C_6$ alkyl, or only one of $R_3$ and $R_4$ is present and forms a carbonyl group with the carbon atom; and each n is independently a positive integer of 0 to 6 and n is not 0 when A is $C_6$-$C_{12}$ arylene or a covalent bond.

The phosphorous-containing flame retardant according to the present invention preferably has a structure of formula (III) or (IV).

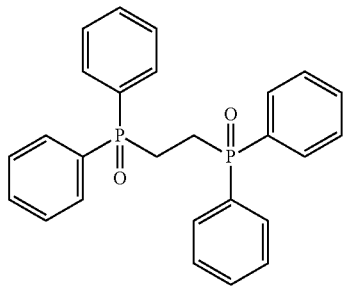

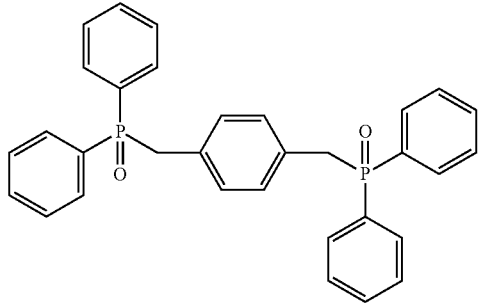

(D) Peroxide

The peroxide (D) comprises but not limited to at least one of dicumyl peroxide and an organic peroxide containing tert-butyl peroxy group.

The organic peroxide containing tert-butyl peroxy group is preferably tert-butyl peroxybenzoate, di(tert-butylperoxy-isopropyl)benzene, 2,5-dimethyl-2,5-di(tert-butylperoxy)-3-hexyne or a combination thereof.

Other Useful Components

The resin composition according to the present invention may be further added with at least one of the following substances or their modified products: epoxy resin, phenolic resin, novolac resin, amine crosslinking agent, cyanate ester, phenoxy resin, benzoxazine resin, styrene resin, polybutadiene resin, polyamide resin, polyimide resin, and polyester resin.

The resin composition according to the present invention may be further added with epoxy resin, which is selected from bisphenol A epoxy resin, bisphenol F epoxy resin, bisphenol S epoxy resin, bisphenol AD epoxy resin, phenol novolac epoxy resin, bisphenol A novolac epoxy resin, o-cresol novolac epoxy resin, trifunctional epoxy resin, tetrafunctional epoxy resin, multifunctional epoxy resin, dicyclopentadiene (DCPD) epoxy resin, phosphorous-containing epoxy resin, p-xylene epoxy resin, naphthalene epoxy resin, benzopyran epoxy resin, biphenyl novolac epoxy resin, phenol aralkyl novolac epoxy resin and a combination thereof.

The low dissipation factor resin composition according to the present invention may be further added with at least one of the following additives: curing accelerator, solvent, crosslinking agent, coupling agent, surfactant, toughener, and inorganic filler.

Preferably, the curing accelerator useful for the resin composition of this invention is 2,5-dimethyl-2,5-di(tert-butylperoxy)-3-hexyne.

The low dissipation factor resin composition according to the present invention may be further added with inorganic filler. The purpose of adding inorganic filler is to increase the thermal conductivity of the resin composition and improve the thermal expansion and mechanical strength, etc. Moreover, the inorganic filler is preferably uniformly distributed in the resin composition.

The inorganic filler may contain silica (fused, non-fused, porous or hollow silica), aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, diamond-like carbon powder, graphite, magnesium carbonate, potassium titanate, ceramic fiber, mica, boehmite, zinc molybdate, ammonium molybdate, zinc borate, calcium phosphate, calcinated talc, talc, silicon nitride, mullite, calcinated kaolin, clay, basic magnesium sulfate whisker, mullite whisker, barium sulfate, magnesium hydroxide whisker, magnesium oxide whisker, calcium oxide whisker, carbon nanotube, nano-scale silica and associated inorganic powder, and powder particles having an organic core and a shell modified by an insulator. The inorganic filler may come in the form of spherical shape, fibrous shape, sheet-like shape, particulate shape, strip-like shape, or needle-like shape, and is selectively pre-treated with a silane coupling agent.

10 to 200 parts by weight of inorganic filler is preferably added, which is preferably spherical nano-scale silica or poly(tetrafluoroethene) powder (PTFE powder).

The purpose of adding curing accelerator is to increase the reaction rate of the resin composition. The purpose of adding surfactant is to ensure uniform distribution of the inorganic filler in the resin composition and to avoid aggregation of the inorganic filler. The purpose of adding toughener is to improve the toughness of the resin composition. The purpose of adding solvent is to change the solid content of the resin composition and to adjust the viscosity of the resin composition.

Preferably, the use amounts of the curing accelerator, coupling agent, toughener and solvent are 0.01 to 5 parts by weight, 0.001 to 0.1 part by weight, 5 to 50 parts by weight, and 50 to 300 parts by weight, respectively.

The resin composition can be optionally added with one or more curing accelerators to increase the curing rate. Any curing accelerator capable of increasing the curing rate of the low dissipation factor resin composition of this invention is useful.

The resin composition may comprise a catalyst, such as a Lewis base or a Lewis acid. The Lewis base includes imidazole, boron trifluoride amine complex, ethyltriphenyl phosphonium chloride, 2-methylimidazole, 2-phenylimidazole, 2-ethyl-4-methylimidazole, triphenylphosphine, and/or 4-dimethylaminopyridine. The Lewis acid comprises a metal salt compound, such as a manganese, iron, cobalt, nickel, copper, or zinc metal salt compound, preferably a metal catalyst such as zinc caprylate or cobalt caprylate.

The coupling agent may be silane and/or siloxane compound.

Preferably, the coupling agent is at least one of an amino silane compound, an amino siloxane compound, a styrene-based silane compound, a styrene-based siloxane compound, an acrylic silane compound, an acrylic siloxane compound, a methacrylic silane compound, a methacrylic siloxane compound, an alkyl silane compound and an alkyl siloxane compound.

The toughener may be rubber resin, carboxyl-terminated polybutadiene acrylonitrile, and/or core-shell polymer.

The solvent may comprise at least one selected from the group consisting of methanol, ethanol, ethylene glycol methyl ether, acetone, methyl ethyl ketone, methyl isobutyl ketone, cyclohexanone, toluene, xylene, methoxyethyl acetate, ethoxyethyl acetate, propoxyethyl acetate, ethyl acetate, dimethylformamide, propylene glycol methyl ether, gamma-butyrolactone (GBL) and diisobutyl ketone (DIBK).

Preferred Embodiment

In one preferred embodiment, a bis(vinylbenzyl) ether compound or a polymer thereof is used as the vinyl-containing compound or a polymer thereof (A) of this invention.

For the low dissipation factor resin composition of this invention, using bis(vinylbenzyl) ether or its polymer may more effectively increase crosslinkability than other vinyl-containing resins, such that the increased crosslinking density may promote bonding between the resins and increase Tg, thereby achieving lower (better) dielectric properties.

Bis(Vinylbenzyl) Ether Compound or Polymer Thereof

The bis(vinylbenzyl) ether compound or a polymer thereof may have a monomer of formula (I), its prepolymer or its copolymer:

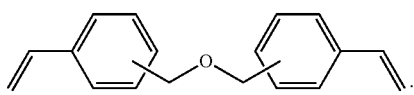

(I)

The present inventors found that the vinyl-containing polymer with a number average molecular weight (Mn) less than 1000, which is a liquid-state resin, may increase the compatibility of the resin composition and increase its crosslinkability. In addition, compared with other vinyl-containing resins, the use of bis(vinylbenzyl) ether can more effectively increase crosslinkability such that the increased crosslinking density may promote bonding between the resins and increase Tg, thereby achieving lower (better) dielectric properties.

More preferably, the bis(vinylbenzyl) ether compound or a polymer thereof is prepared by the following process.

In one embodiment, the bis(vinylbenzyl) ether compound is prepared by reacting 4-chloro-methyl styrene in a solvent to form the bis(vinylbenzyl) ether compound.

Preferably, the bis(vinylbenzyl) ether compound is prepared by the following steps:

providing 4-chloro-methyl styrene as starting material; and reacting the 4-chloro-methyl styrene in the presence of a catalytic amount of quaternary ammonium salt as a phase transfer catalyst to obtain a bis(vinylbenzyl) ether compound.

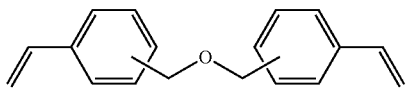

In one embodiment, the phase transfer catalyst is methyl trioctyl ammonium chloride.

In one embodiment, the reaction is carried out in the presence of alkali metal hydroxide, preferably KOH.

In one embodiment, the reaction uses 0.1 to 10 parts by weight of catalyst.

The solvent used in the reaction may be at least one of methanol, ethanol, ethylene glycol methyl ether, acetone, methyl ethyl ketone, methyl isobutyl ketone, cyclohexanone, toluene, xylene, methoxyethyl acetate, ethoxyethyl acetate, propoxyethyl acetate, ethyl acetate, dimethylformamide, propylene glycol methyl ether, gamma-butyrolactone (GBL) and diisobutyl ketone (DIBK).

The use amount of solvent in the reaction is not particularly limited, and any proper amount may be useful. The amount of solvent is not an essential feature of this invention.

The use amount of potassium hydroxide (alkali metal hydroxide) in the reaction is not particularly limited, and any proper amount may be useful.

The reaction temperature is 50 to 90° C.

The reaction time is 1 to 10 hours, preferably 4 hours.

In one embodiment, the process for preparing the bis (vinylbenzyl) ether compound of this invention is followed by toluene extraction and methanol washing to remove impurities, so as to obtain higher purity of the bis(vinylbenzyl) ether compound. However, the post-treatment process is not limited thereto.

In summary, the bis(vinylbenzyl) ether resin according to the present invention has the following advantages:

(1) It effectively increases the compatibility of resin in the resin composition to reduce the void content of the laminate.

(2) For the low dissipation factor resin composition of this invention, using bis(vinylbenzyl) ether may more effectively increase crosslinkability than other vinyl-containing resins, such that the increased crosslinking density may promote bonding between the resins and increase Tg, thereby achieving lower (better) dielectric properties.

Product

Another object of this invention is to provide a resin film which comprises the above-mentioned resin composition. The resin film may be coated on a polyester film (PET film)

or a polyimide film (PI film) or coated on a copper foil, followed by heating and baking to the B-stage to form a resin coated copper (RCC).

Yet another object of this invention is to provide a prepreg which may comprise a reinforcement material and the above-mentioned resin composition adhered onto the reinforcement material by impregnation and heated at high temperature to a semi-cured state. The reinforcement material may be fiber material, woven fabric, and non-woven fabric, such as a fiberglass fabric, which is useful for increasing the mechanical strength of the prepreg. Moreover, the reinforcement material may be optionally pre-treated by a saline coupling agent.

Still another object of this invention is to provide a laminate, such as a copper-clad laminate, which comprises two or more metal foils and at least one insulation layer. The metal foil may be for example a copper foil and may further contain at least one metal alloy such as aluminum, nickel, platinum, silver, gold, etc.; the insulation layer is formed by curing the prepreg or resin film under high temperature and high pressure, such as by superimposing the prepreg between two metal foils and performing lamination under high temperature and high pressure.

Another object of this invention is to provide a printed circuit board which comprises at least one such laminate, wherein the circuit board may be prepared by conventional processes.

The embodiments below further disclose and describe the present invention so as to enable persons skilled in the art to make and use the present invention accordingly. However, the embodiments below are illustrative, rather than restrictive, of the present invention. All equivalent modifications and changes made to the embodiments below by persons skilled in the art without departing from the spirit embodied in the present invention shall fall within the scope of the present invention.

Unless otherwise specified, the starting materials of the present invention may be commercially available or prepared by conventional methods known in the art. Unless otherwise defined or specified, all technical and scientific terms used herein have the same meanings known by those skilled in the art. In addition, any process or material similar or equivalent to those cited herein may be used in the present invention.

The synthesis processes recited above constitute only the synthesis routes of a part of compounds of this invention. Based on the examples illustrated, persons skilled in the art can make adjustment to synthesize other compounds of this invention, or persons skilled in the art may synthesize the compounds of this invention according to the teachings in prior arts.

Due to the disclosure of this invention, other aspects of this invention are readily comprehensible to persons skilled in the art.

While the present invention will now be illustrated in conjunction with the following embodiments, it should be understood that these embodiments are exemplary only and are not intended to limit the scope of the present invention. In the examples and embodiments below, experimental processes without specified conditions are usually carried out according to national standards; if there is no corresponding national standards, generally acceptable international standards, routine conditions or conditions proposed by manufacturers are followed. In addition, unless otherwise specified, all parts and percentages are by weight, and the molecular weight of a polymer is a number average molecular weight.

EXAMPLE

Chemicals used in the preparatory examples, examples and comparative examples are listed below.

Aliquat 336: methyl trioctyl ammonium chloride, available from Starks' Catalyst

BMI-2300: bismaleimide resin, available from Daiwakasei Industry Co. Ltd.

OPE-2st: vinylbenzyl-terminated diphenyl polyphenylene oxide resin, available from Mitsubishi Gas Chemical Co., Inc.

SA-9000: methacrylate-terminated bisphenol A polyphenylene oxide resin, available from Sabic 8010: decabromodiphenyl ethane flame retardant, available from Albemarle BT-93: ethylene-bis(tetrabromophthalimide), available from Albemarle SPB-100: phosphazene, available from Otsuka Chemical Co., Ltd.

Ricon257: styrene-butadiene-divinylbenzene terpolymer, available from Cray Valley R-45vt: vinyl functional polybutadiene urethane oligomer, available from Cray Valley Ricon184MA6: styrene-butadiene-maleic anhydride terpolymer, available from Cray Valley 25B: 2,5-dimethyl-2,5-di(tert-butylperoxy)-3-hexyne, available from NOF Corporation SQ-5500: spherical silica, available from Admatechs SP3: poly(tetrafluoroethene) powder, available from Admatechs To fully illustrate the purposes, features and effects, the present invention is described in detail through the examples and embodiments below in conjunction with the accompanying drawings.

Preparatory Example 1

One approach for preparing the bis(vinylbenzyl) ether compound (BVBE) is described below.

Add 10 g of chloro-methyl styrene (CMS, i.e. 4-chloro-methyl styrene (CMS-P), mixture of isomers:para/meta=7:3) and 150 ml of deionized water into a reaction tank and then stir at a temperature of 50 to 90° C. Add 12 g of potassium hydroxide and 0.5 g of N-methyl-N,N,N-trioctyloctan-1-ammonium chloride and keep stirring for 4 hours, followed by washing with toluene to obtain an orange liquid solution containing bis(vinylbenzyl) ether resin with molecular weight Mw<1000 and toluene.

Examine and analyze the bis(vinylbenzyl) ether compound with FTIR to obtain the result as shown in the accompanying figures.

Figure 2:
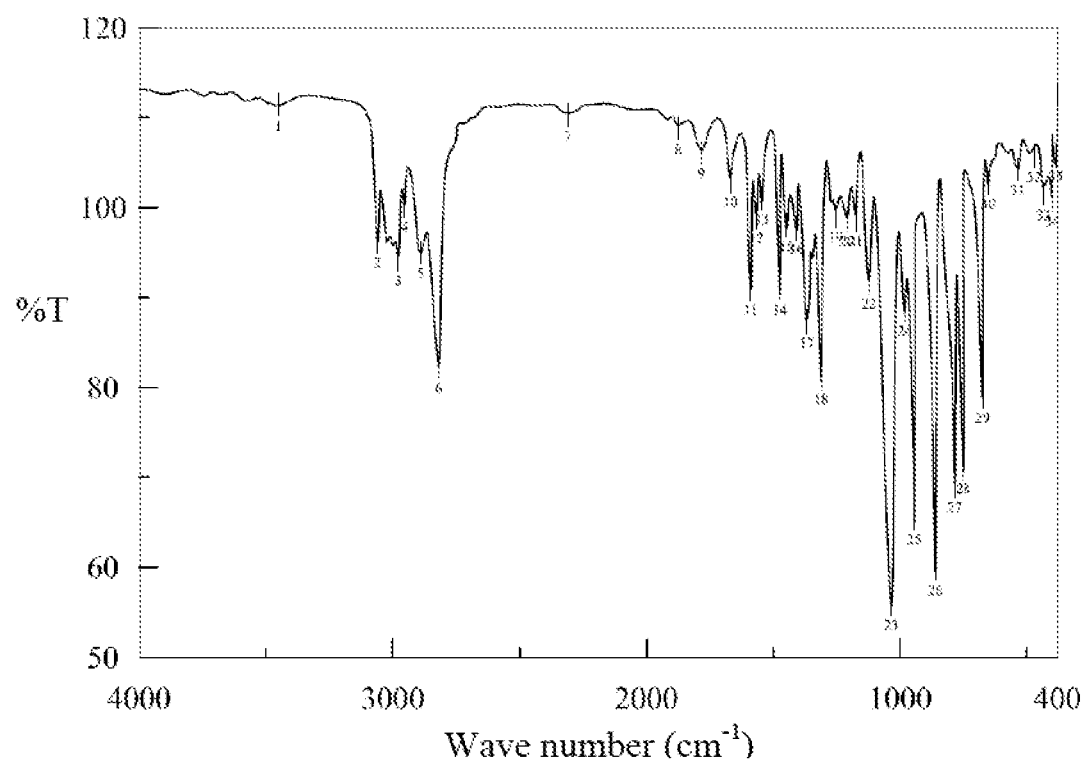
FIG. 2 illustrates the FTIR result of the bis(vinylbenzyl) ether resin of Preparatory Example 1 according to the present invention.

FIG. 1 is the FTIR result of CMS-P, and FIG. 2 is the FTIR result of the bis(vinylbenzyl) ether compound, both as tabulated below. The comparison of the two figures illustrates that the reaction product bis(vinylbenzyl) ether compound has an increased characteristic peak at 900 to 1000 cm$^{-1}$, indicating the increase of vinyl group, and an increased characteristic peak at 1080 to 1100 cm$^{-1}$, indicating the formation of ether bond and the completion of the reaction.

| Result of Peak Picking of FIG. 1 | | | | | | | |
|---|---|---|---|---|---|---|---|
| No. | Position | Intensity | No. | Position | Intensity | No. | Position | Intensity |
| 1 | 3748.94 | 95.9904 | 2 | 3588.88 | 96.0749 | 3 | 3087.48 | 87.8562 |
| 4 | 3008.41 | 87.8583 | 5 | 2981.41 | 89.0527 | 6 | 2960.2 | 89.0774 |
| 7 | 2867.63 | 93.7343 | 8 | 2709.5 | 96.5165 | 9 | 2341.16 | 96.0261 |
| 10 | 1911.11 | 93.9616 | 11 | 1826.26 | 91.8570 | 12 | 1702.84 | 93.8039 |
| 13 | 1629.55 | 87.9980 | 14 | 1602.56 | 89.5538 | 15 | 1581.34 | 90.4603 |
| 16 | 1509.99 | 87.6067 | 17 | 1484.92 | 88.9629 | 18 | 1442.49 | 87.8180 |
| 19 | 1403.92 | 86.7622 | 20 | 1265.07 | 84.5424 | 21 | 1213.01 | 90.8386 |
| 22 | 1160.94 | 89.8907 | 23 | 1112.73 | 90.0035 | 24 | 1093.44 | 92.2898 |
| 25 | 1016.3 | 90.6111 | 26 | 989.304 | 84.6498 | 27 | 910.236 | 83.8870 |
| 28 | 842.74 | 86.0530 | 29 | 800.314 | 87.1258 | 30 | 728.961 | 84.8265 |
| 31 | 705.819 | 83.4729 | 32 | 684.606 | 84.8763 | 33 | 647.965 | 88.4215 |
| 34 | 553.47 | 89.1995 | 35 | 484.045 | 87.2252 | 36 | 420.406 | 76.6830 |

| Result of Peak Picking of FIG.2 | | | | | | | |
|---|---|---|---|---|---|---|---|
| No. | Position | Intensity | No. | Position | Intensity | No. | Position | Intensity |
| 1 | 3459.67 | 111.5608 | 2 | 3085.55 | 96.5724 | 3 | 3006.48 | 94.5511 |
| 4 | 2979.48 | 100.4722 | 5 | 2921.63 | 95.5794 | 6 | 2856.06 | 82.6797 |
| 7 | 2337.3 | 110.7186 | 8 | 1907.25 | 109.3759 | 9 | 1820.47 | 106.7689 |
| 10 | 1700.91 | 103.4513 | 11 | 1629.55 | 91.4731 | 12 | 1604.48 | 97.6026 |
| 13 | 1581.34 | 101.5606 | 14 | 1511.92 | 90.8984 | 15 | 1484.92 | 97.8267 |
| 16 | 1444.42 | 97.0233 | 17 | 1405.85 | 87.3444 | 18 | 1357.64 | 81.5127 |
| 19 | 1286.29 | 99.5051 | 20 | 1247.72 | 99.2471 | 21 | 1211.08 | 98.9193 |
| 22 | 1159.01 | 91.8880 | 23 | 1085.73 | 55.9248 | 24 | 1016.3 | 89.1107 |
| 25 | 989.304 | 66.3608 | 26 | 908.308 | 59.0760 | 27 | 827.312 | 68.8206 |
| 28 | 796.457 | 71.4546 | 29 | 713.533 | 78.5632 | 30 | 680.749 | 104.6642 |
| 31 | 559.255 | 105.4061 | 32 | 493.688 | 106.4060 | 33 | 458.975 | 102.5090 |
| 34 | 428.12 | 101.5099 | 35 | 410.763 | 107.5311 | | | |

Preparatory Example 2

Heat 45 g of the bis(vinylbenzyl) ether compound and 30 g of BMI-2300 (bismaleimide resin) and control the melting temperature between 100 and 150° C. Lower the temperature after BMI and the bis(vinylbenzyl) ether compound have formed a uniform solution. At a temperature of 50° C., add 100 g of vinyl-benzylated polyphenylene oxide resin and about 50 g of toluene, followed by stirring. A uniform compound (Compound A) was formed at the room temperature, which has a solid content of 65%.

Preparation of DPPO Derivative

Mix and stir 206 g of diphenylphosphine oxide (DPPO), 90 g of dichloro-p-xylene and 1200 g of 1,2-dichlorobenzene. Heat the reaction mixture in nitrogen atmosphere at 160° C. for 12 to 24 hours. Cool to the room temperature and filter, followed by drying under vacuum to obtain the phosphorous flame retardant of formula (IV) as white powder with a phosphorous content about 12%.

The resin composition of each embodiment and the laminate properties thereof are listed in the tables below, including Examples E1 to E16 and Comparative Examples C1 to C14.

| Resin composition | | Component | E1 | E2 | E3 | E4 |
|---|---|---|---|---|---|---|
| flame retardant | high melting point phosphorous-containing flame retardant | DPPO derivative | 35 | 35 | | 35 |
| vinyl-containing compound and optional component (B) | bis(vinylbenzyl) ether prepolymer | Compound A | | | | 100 |
| | vinyl-benzylated polyphenylene oxide | OPE-2st | | 50 | | |
| | bis(vinylbenzyl) ether | BVBE | 100 | 50 | 100 | |
| | maleimide | BMI2300 | | | | |
| peroxide | peroxide | 25B | 0.9 | 0.9 | 0.9 | 0.9 |
| inorganic filler | spherical silica | SQ-5500 | 60 | 60 | 60 | 60 |
| solvent | toluene | | 100 | 100 | 100 | 100 |
| | MEK | | 30 | 30 | 30 | 30 |

| Laminate property | Test item (method) | Unit | E1 | E2 | E3 | E4 |
|---|---|---|---|---|---|---|
| glass transition temperature | Tg (DMA) | ° C. | 205 | 210 | 215 | 218 |

-continued

| Laminate property | Test item (method) | Unit | E1 | E2 | E3 | E4 |
|---|---|---|---|---|---|---|
| thermal expansion | dimensional change (TMA) | % | 2.1 | 2.0 | 2.5 | 2.05 |
| 288° C. thermal resistance | T288 (TMA) | minute | >60 | >60 | >60 | >60 |
| solder dip thermal resistance | S/D | cycle | >20 | >20 | >20 | >20 |
| dielectric constant | Dk@10 GHz | NA | 3.52 | 3.55 | 3.38 | 3.45 |
| dissipation factor | Df@10 GHz | NA | 0.0046 | 0.0045 | 0.0039 | 0.0042 |
| flame retardancy | UL94 | NA | V-0 | V-0 | burn out | V-0 |
| void content | visual inspection (SEM) | number of void | <3 | <3 | <3 | <3 |

| Resin composition | | Component | C1 | C2 | C3 |
|---|---|---|---|---|---|
| flame retardant | high melting point phosphorous-containing flame retardant | DPPO derivative | 35 | 35 | 35 |
| vinyl containing compound and optional component (B) | bis(vinylbenzyl) ether prepolymer | Compound A | | | |
| | vinyl-benzylated polyphenylene oxide | OPE-2st | 100 | | 50 |
| | bis(vinylbenzyl) ether | BVBE | | | |
| | maleimide | BMI2300 | | 100 | 50 |
| peroxide | peroxide | 25B | 0.9 | 0.9 | 0.9 |
| inorganic filler | spherical silica | SQ-5500 | 60 | 60 | 60 |
| solvent | toluene | | 100 | 100 | 100 |
| | MEK | | 30 | 30 | 30 |

| Laminate property | Test item (method) | Unit | C1 | C2 | C3 |
|---|---|---|---|---|---|
| glass transition temperature | Tg (DMA) | ° C. | 200 | 232 | 220 |
| thermal expansion | dimensional change (TMA) | % | 2.85 | 1.55 | 2.15 |
| 288° C. thermal resistance | T288 (TMA) | minute | >60 | >60 | >60 |
| solder dip thermal resistance | S/D | cycle | >20 | >20 | >20 |
| dielectric constant | Dk@10 GHz | NA | 3.69 | 3.88 | 3.75 |
| dissipation factor | Df@10 GHz | NA | 0.0055 | 0.0075 | 0.0061 |
| flame retardancy | UL94 | NA | V-0 | V-0 | V-0 |
| void content | visual inspection (SEM) | number of void | >10 | >10 | >10 |

| Resin composition | | Component | E5 | E6 | E7 | E8 |
|---|---|---|---|---|---|---|
| vinyl-containing compound and optional component (B) | bis(vinylbenzyl) ether prepolymer | Compound A | | 100 | | |
| | vinyl-benzylated polyphenylene oxide | OPE-2st | | | 100 | |
| | bis(vinylbenzyl) ether | BVBE | 100 | | | 100 |
| | styrene-butadiene-divinylbenzene terpolymer | Ricon257 | 15 | 15 | 15 | 30 |
| | vinyl functional polybutadiene urethane oligomer | R-45vt | | | | |
| | styrene-butadiene-maleic anhydride terpolymer | Ricon184MA6 | 15 | 15 | 15 | 35 |
| | triallyl isocyanurate | TAIC | | | | |
| | maleimide | BMI2300 | | | | |
| flame retardant | high melting point phosphorous-containing flame retardant | DPPO derivative | 45 | 45 | 45 | 45 |

-continued

| Resin composition | Component | | E5 | E6 | E7 | E8 |
|---|---|---|---|---|---|---|
| | phosphazene | SPB-100 | | | | |
| | decabromodiphenyl ethane | 8010 | | | | |
| peroxide | peroxide | 25B | 0.9 | 0.9 | 0.9 | 0.9 |
| inorganic filler | spherical silica | SQ-5500 | 60 | 60 | 60 | 60 |
| organic filler | PTFE | SP3 | 0 | 0 | 0 | 0 |
| solvent | toluene | | 100 | 100 | 100 | 100 |
| | MEK | | 30 | 30 | 30 | 30 |

| Laminate property | Test item (method) | Unit | E5 | E6 | E7 | E8 |
|---|---|---|---|---|---|---|
| glass transition temperature | Tg (DMA) | °C. | 206 | 201 | 203 | 205 |
| thermal expansion | dimensional change (TMA) | % | 2.15 | 2.45 | 2.5 | 2.3 |
| 288° C. thermal resistance | T288 (TMA) | minute | >60 | >60 | >60 | >60 |
| solder dip thermal resistance | S/D | cycle | >20 | >20 | >20 | >20 |
| dielectric constant | Dk@10 GHz | | NA | 3.51 | 3.48 | 3.45 | 3.48 |
| dissipation factor | Df@10 GHz | | NA | 0.0046 | 0.0045 | 0.0046 | 0.0046 |
| flame retardancy | UL94 | | NA | V-0 | V-0 | V-0 | V-0 |

| Resin composition | Component | E9 | E10 | E11 | E12 | E13 |
|---|---|---|---|---|---|---|
| vinyl-containing compound and optional component (B) | bis(vinylbenzyl) ether prepolymer | | | 90 | 25 | 100 |
| | vinyl-benzylated polyphenylene oxide | | 50 | 10 | 75 | |
| | bis(vinylbenzyl) ether | 100 | 50 | | | |
| | styrene-butadiene-divinylbenzene terpolymer | 15 | 15 | 35 | 35 | 35 |
| | vinyl functional polybutadiene urethane oligomer | | | | | |
| | styrene-butadiene-maleic anhydride terpolymer | 15 | 15 | 7.5 | 7.5 | 7.5 |
| | triallyl isocyanurate | | | | | |
| | maleimide | 50 | 15 | | | |
| flame retardant | high melting point phosphorous-containing flame retardant | 45 | 10 | 20 | 0 | 70 |
| | phosphazene | | | | | |
| | decabromodiphenyl ethane | | | | | |
| peroxide | peroxide | 0.9 | 0.9 | 0.9 | 0.9 | 0.9 |
| inorganic filler | spherical silica | 60 | 60 | 60 | 60 | 60 |
| organic filler | PTFE | 0 | 0 | 0 | 0 | 10 |
| solvent | toluene | 100 | 100 | 100 | 100 | 100 |
| | MEK | 30 | 30 | 30 | 30 | 30 |

| Laminate property | Test item (method) | E9 | E10 | E11 | E12 | E13 |
|---|---|---|---|---|---|---|
| glass transition temperature | Tg (DMA) | 235 | 225 | 202 | 201 | 212 |
| thermal expansion | dimensional change (TMA) | 1.56 | 1.78 | 2.34 | 2.56 | 1.9 |
| 288° C. thermal resistance | T288 (TMA) | >60 | >60 | 30 | >60 | >60 |
| solder dip thermal resistance | S/D | >20 | >20 | >20 | >20 | >20 |
| dielectric constant | Dk@10 GHz | 3.55 | 3.58 | 3.52 | 3.51 | 3.48 |
| dissipation factor | Df@10 GHz | 0.0051 | 0.0051 | 0.0048 | 0.0047 | 0.0043 |
| flame retardancy | UL94 | V-0 | V-2 | V-1 | burn out | V-0 |

| Resin composition | Component | | E14 | E15 | E16 |
|---|---|---|---|---|---|
| vinyl-containing compound and optional component (B) | bis(vinylbenzyl) ether prepolymer | Compound A | 100 | 70 | 100 |
| | vinyl-benzylated polyphenylene oxide | OPE-2st | | | |
| | bis(vinylbenzyl) ether | BVBE | | 30 | |
| | styrene-butadiene-divinylbenzene terpolymer | Ricon257 | 15 | 35 | 35 |
| | vinyl functional polybutadiene urethane oligomer | R-45vt | 7.5 | | |
| | styrene-butadiene-maleic anhydride terpolymer | Ricon184MA6 | 7.5 | 7.5 | 7.5 |
| | triallyl isocyanurate | TAIC | | | |
| | maleimide | BMI2300 | | | |
| flame retardant | high melting point phosphorous-containing flame retardant | DPPO derivative | 30 | 0 | 40 |
| | phosphazene | SPB-100 | | | 5 |
| | tetrabromophthalimide | BT-93 | | | 35 |
| | decabromodiphenyl ethane | 8010 | | 80 | 70 |
| peroxide | peroxide | 25B | 0.9 | 0.9 | 0.9 |
| inorganic filler | spherical silica | SQ-5500 | 60 | 60 | 60 |
| organic filler | PTFE | SP3 | 10 | 10 | 10 |
| solvent | toluene | | 100 | 100 | 100 |
| | MEK | | 30 | 30 | 30 |

| Laminate property | Test item (method) | Unit | E14 | E15 | E16 |
|---|---|---|---|---|---|
| glass transition temperature | Tg (DMA) | °C. | 215 | 205 | 200 |
| thermal expansion | dimensional change (TMA) | % | 1.95 | 2.42 | 2.55 |
| 288° C. thermal resistance | T288 (TMA) | minute | >60 | >60 | >60 |
| solder dip thermal resistance | S/D | cycle | >20 | >20 | >20 |
| dielectric constant | Dk@10 GHz | NA | 3.51 | 3.45 | 3.57 |
| dissipation factor | Df@10 GHz | NA | 0.0044 | 0.0045 | 0.0048 |
| flame retardancy | UL94 | NA | V-0 | V-0 | V-0 |

| Resin composition | Component | | C4 | C5 | C6 |
|---|---|---|---|---|---|
| vinyl-containing compound and optional component (B) | bis(vinylbenzyl) ether prepolymer | Compound A | | | |
| | vinyl-benzylated polyphenylene oxide | OPE-2st | 80 | 70 | |
| | bis(vinylbenzyl) ether | BVBE | | | |
| | styrene-butadiene-divinylbenzene terpolymer | Ricon257 | 15 | 15 | 50 |
| | vinyl functional polybutadiene urethane oligomer | R-45vt | | | |
| | styrene-butadiene-maleic anhydride terpolymer | Ricon184MA6 | 15 | 15 | 30 |
| | triallyl isocyanurate | TAIC | | | |
| | maleimide | BMI2300 | | 50 | |
| flame retardant | high melting point phosphorous-containing flame retardant | DPPO derivative | 45 | 45 | 40 |
| | phosphazene | SPB-100 | | | |
| | decabromodiphenyl ethane | 8010 | | | |
| peroxide | peroxide | 25B | 0.9 | 0.9 | 0.9 |
| inorganic filler | spherical silica | SQ-5500 | 60 | 60 | 60 |
| organic filler | PTFE | SP3 | 0 | 0 | 0 |
| solvent | toluene | | 100 | 100 | 100 |
| | MEK | | 30 | 30 | 30 |

| Laminate property | Test item (method) | Unit | C4 | C5 | C6 |
|---|---|---|---|---|---|
| glass transition temperature | Tg (DMA) | °C. | 201 | 215 | 80 |
| thermal expansion | dimensional change | % | 2.37 | 2.07 | 4.1 |
| 288° C. thermal resistance | T288 (TMA) | minute | >60 | >60 | 30 |
| solder dip thermal resistance | S/D | cycle | >20 | >20 | >20 |
| dielectric constant | Dk@10 GHz | NA | 3.73 | 3.76 | 3.55 |
| dissipation factor | Df@10 GHz | NA | 0.0049 | 0.0056 | 0.0058 |
| flame retardancy | UL94 | NA | V-0 | V-0 | V-0 |

| Resin composition | | Component | C7 | C8 | C9 | C10 | C11 | C12 | C13 | C14 |
|---|---|---|---|---|---|---|---|---|---|---|
| vinyl-containing compound and optional component (B) | bis(vinylbenzyl) ether prepolymer | Compound A | | 0 | 100 | 50 | | | | |
| | vinyl-benzylated polyphenylene oxide | OPE-2st | | 70 | | | 100 | | | |
| | bis(vinylbenzyl) ether | BVBE | | | | | | 100 | 100 | 50 |
| | styrene-butadiene-divinylbenzene terpolymer | Ricon257 | 15 | 35 | 35 | | | 5 | 50 | 15 |
| | vinyl functional polybutadiene urethane oligomer | R-45vt | | | | 7.5 | | | | |
| | styrene-butadiene-maleic anhydride terpolymer | Ricon184MA6 | 15 | 7.5 | | | | 5 | 50 | 15 |
| | triallyl isocyanurate | TAIC | 50 | 30 | 35 | | 30 | | | |
| | maleimide | BMI2300 | 50 | | | | | | | |
| flame retardant | high melting point phosphorous-containing flame retardant | DPPO derivative | 30 | 70 | 0 | 50 | 45 | 45 | 45 | 45 |
| | phosphazene | SPB-100 | | | | | | | | |
| | decabromodiphenyl ethane | 8010 | | | | | | | | |
| peroxide | peroxide | 25B | 0.9 | 0.9 | 0.9 | 0.9 | 0.9 | 0.9 | 0.9 | 0.9 |
| inorganic filler | spherical silica | SQ-5500 | 60 | 60 | 60 | 60 | 60 | 60 | 60 | 60 |
| organic filler | PTFE | SP3 | 0 | 10 | 0 | 0 | 0 | 0 | 0 | 0 |
| solvent | toluene | | 100 | 100 | 100 | 100 | 100 | 100 | 100 | 100 |
| | MEK | | 30 | 30 | 30 | 30 | 30 | 30 | 30 | 30 |

| Laminate property | Test item (method) | | C7 | C8 | C9 | C10 | C11 | C12 | C13 | C14 |
|---|---|---|---|---|---|---|---|---|---|---|
| glass transition temperature | Tg (DMA) | °C. | 201 | 191 | 218 | 180 | 200 | 201 | 160 | 170 |
| thermal expansion | dimensional change (TMA) | % | 3.13 | 2.85 | 2.05 | 3.11 | 2.85 | 3.13 | 3.5 | 3.45 |
| 288° C. thermal resistance | T288 (TMA) | minute | 30 | >60 | >60 | 30 | >60 | 30 | 15 | 30 |
| solder dip thermal resistance | S/D | cycle | >20 | >20 | >20 | >20 | >20 | >20 | 15 | 15 |
| dielectric constant | Dk@10 GHz | NA | 3.75 | 3.63 | 3.49 | 3.75 | 3.69 | 3.75 | 3.65 | 3.68 |
| dissipation factor | Df@10 GHz | NA | 0.0058 | 0.0053 | 0.0051 | 0.0058 | 0.0056 | 0.0058 | 0.0048 | 0.0048 |
| flame retardancy | UL94 | NA | V-0 | V-0 | burn out | V-0 | V-0 | V-0 | V-0 | V-0 |

Resin compositions of the examples and comparative examples listed above were well mixed in a stirred tank separately and then placed in an impregnation tank, and fiberglass fabrics (2116 type) were individually passed through the impregnation tank to impregnate the fiberglass fabrics with the resin compositions respectively, followed by heating and baking to a semi-cured state to obtain prepregs.

From the prepregs prepared batchwise above, four prepregs from the same batch were covered by two 18 μm copper foils from the top and bottom and subjected to a lamination process under vacuum at 210° C. for 2 hours to form a copper-clad laminate, in which the four prepregs were cured to form the insulation layers between the two copper foils.

The copper-clad laminates obtained above and copper-free laminates obtained by etching were subjected to physical property tests, wherein the copper-free laminates containing four laminated prepregs have a resin content of about 55%. For dielectric constant and dissipation factor analysis, laminates made from two prepregs without copper foil were tested; for other test items, laminates made from four prepregs without copper foil were tested. Physical properties tested include: glass transition temperature (Tg, measured by DMA), thermal expansion (CTE z-axis, dimensional change: 50 to 260° C., measured by TMA, %; lower dimensional change percentage is more preferred), thermal resistance (T288, measured by TMA), copper-clad laminate solder dip test (S/D, 288° C., 10 seconds, thermal resistance cycle measurement), dielectric constant (Dk, measured by an AET's microwave dielectrometer; lower Dk represents a better dielectric property), dissipation factor (Df, measured by an AET's microwave dielectrometer; lower Df represents a better dielectric property), flame retardancy (flaming test, UL94, wherein V-0 is superior to V-1, V-1 is superior to V-2, and burning out refers to out of specification), and void content (visual inspection of void number, measured by SEM).

The test results reveal that: (1) E1 to E4 indicate that BVBE or its prepolymer has excellent dielectric properties but poor flame retardancy; (2) the comparison of E4 and C1 to C3 indicates that BVBE, BMI and vinyl-benzylated polyphenylene oxide prepolymer have overall Dk, Df and Tg better than each individual component thereof or their mixture; (3) the comparison of E1 and E4 indicates that pre-polymerization of BVBE and BMI-2300 with OPE-2st may attain better Tg, lower CTE and lower Dk/Df properties; (4) the comparison of E1 or E4 with C1 to C2 indicates that the addition of BMI-2300 in the composition will advantageously increase the Tg and lower CTE of the laminate but disadvantageously increase Dk/Df; the drawbacks may be obviated by using BMI-2300 and the above-mentioned pre-polymerized resin; (5) the comparison of E1 or E4 with C3 indicates that the use of OPE-2st and BMI-2300 may achieve synergistically overall better laminate properties, and the use of BVBE or its prepolymer may achieve even better Df; and (6) C6 and C9 have better dielectric constant, but the embodiments of this invention may achieve overall better laminate properties.

CONCLUSION

The low dissipation factor resin composition according to the present invention uses bis(vinylbenzyl) ether instead of other vinyl-containing resins to effectively increase cross-linkability, and the increased crosslinking density may promote bonding between the resins and increase Tg, thereby achieving lower (better) dielectric properties.

The above detailed description is merely illustrative of the preferred embodiments of this invention and is not intended to limit the scope of this invention, which is broadly defined by the claims set forth below. Technical solutions, implementations or processes accomplished by others will be considered to fall within the scope of the claims if they are completely identical to those defined in the appended claims or are equivalent modifications of this invention.

All references cited in this invention are incorporated by reference in their entirety, as if they were referenced individually. In addition, it is understood that after reading this specification, skilled artisans appreciate that various changes and modifications are possible, but these equivalents shall also fall within the scope of the appended claims.

What is claimed is:

1. A low dissipation factor resin composition, comprising the following components:

(A) 100 to 150 parts by weight of a vinyl-containing compound or a polymer thereof selected from a bis (vinylbenzyl) ether compound or a polymer thereof, which comprises a monomer of formula (I), a prepolymer thereof or a copolymer thereof:

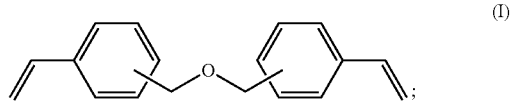

(B) 0 to 75 parts by weight of styrene-butadiene-divinyl-benzene terpolymer, styrene-butadiene-maleic anhydride terpolymer, vinyl functional polybutadiene urethane oligomer or a combination thereof;

(C) 30 to 150 parts by weight of flame retardant; and (D) 0.1 to 10 parts by weight of peroxide.

2. The resin composition of claim 1, wherein the bis (vinylbenzyl) ether compound or a polymer thereof is prepared by the following steps:

providing 4-chloro-methyl styrene as starting material;

reacting the 4-chloro-methyl styrene in the presence of a catalytic amount of quaternary ammonium salt as a phase transfer catalyst to obtain a bis(vinylbenzyl) ether compound; and optionally polymerizing the bis(vinylbenzyl) ether compound to obtain a bis(vinylbenzyl) ether polymer.

3. The resin composition of claim 1, wherein the component (B) is 25 to 75 parts by weight of styrene-butadiene-divinylbenzene terpolymer, styrene-butadiene-maleic anhydride terpolymer, vinyl functional polybutadiene urethane oligomer or a combination thereof.

4. The resin composition of claim 1, wherein the flame retardant (C) is selected from the compound of formula (II):

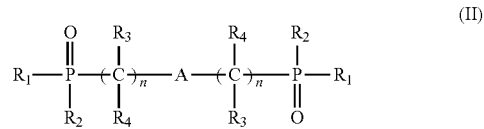

wherein A is a covalent bond, $C_6$-$C_{12}$ arylene, $C_3$-$C_{12}$ cycloalkylene or $C_6$-$C_{12}$ cycloalkenylene, and wherein the $C_3$-$C_{12}$ cycloalkylene or the $C_6$-$C_{12}$ cycloalkenylene is optionally substituted by $C_1$-$C_{12}$ alkyl;

$R_1$ and $R_2$ are the same or different and individually represent H, alkoxy, aryloxy, alkyl, aryl, or silanyl;

$R_3$ and $R_4$ are the same or different and individually represent H, hydroxyl, or $C_1$-$C_6$ alkyl, or only one of $R_3$ and $R_4$ is present and forms a carbonyl group with the carbon atom; and each n is independently a positive integer of 0 to 6 and n is not 0 when A is $C_6$-$C_{12}$ arylene or a covalent bond.

5. The resin composition of claim 1, wherein the flame retardant (C) has a structure represented by formula (III) or (IV):

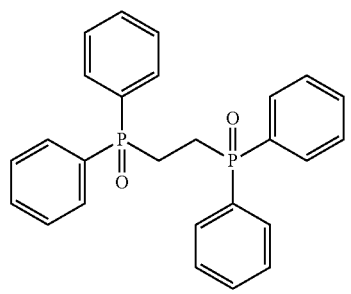
(III)
(IV)
6. A product made from the resin composition of claim 1, which comprises a resin film, a prepreg, a laminate or a printed circuit board.
* * * * *